US 8,488,499 B2

(12) United States Patent
Frigo et al.

(10) Patent No.: US 8,488,499 B2
(45) Date of Patent: Jul. 16, 2013

(54) SYSTEM AND METHOD OF ENHANCED QUALITY OF SERVICE OF WIRELESS COMMUNICATION BASED ON REDUNDANT SIGNAL RECEPTION ON TWO OR MORE ANTENNA DIVERSITY INPUTS

(75) Inventors: Louis M. Frigo, Brookfield, WI (US); Neal Seidl, Pewaukee, WI (US); Matthew Grubis, New Berlin, WI (US); Lee Zielinski, New Berlin, WI (US); Alan Owan, Shorewood, WI (US); Peter Arndt, Germantown, WI (US); Peter Jager, Cedarburg, WI (US); Syedsaad Ali, Waukesha, WI (US); Karina Carvalho-Bond, Livermore, CA (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 12/984,249

(22) Filed: Jan. 4, 2011

(65) Prior Publication Data
US 2012/0170494 A1    Jul. 5, 2012

(51) Int. Cl.
*H04B 7/00* (2006.01)
(52) U.S. Cl.
USPC ........................................................ 370/310
(58) Field of Classification Search
USPC ......... 370/203, 204–215, 229–240, 310–394, 370/395.1, 395.3, 395.4, 395.41, 395.42, 370/395.5, 395.52, 395.53, 412–421, 431–529
See application file for complete search history.

(56) References Cited

U.S. PATENT DOCUMENTS

| | | | |
|---|---|---|---|
| 5,168,502 A | 12/1992 | Millet | |
| 5,479,400 A | 12/1995 | Dilworth et al. | |
| 6,088,407 A | 7/2000 | Buternowsky et al. | |
| 6,192,038 B1 | 2/2001 | Wallerius et al. | |
| 6,445,910 B1 | 9/2002 | Oestreich | |
| 6,546,026 B1 * | 4/2003 | Goeddel | 370/513 |
| 6,862,488 B2 | 3/2005 | Mansour-Awad | |
| 7,454,181 B2 | 11/2008 | Banister et al. | |
| 7,668,542 B2 | 2/2010 | Bims | |
| 2005/0265298 A1 * | 12/2005 | Adachi et al. | 370/338 |
| 2006/0189280 A1 * | 8/2006 | Goldberg | 455/101 |

(Continued)

FOREIGN PATENT DOCUMENTS
EP    2197142 A1    6/2010

OTHER PUBLICATIONS

Search Report from corresponding GB Application No. GB1122250.2 dated Apr. 23, 2012.

*Primary Examiner* — Jung-Jen Liu
(74) *Attorney, Agent, or Firm* — Andrus, Sceales, Starke & Sawall, LLP (57) ABSTRACT

The present application includes a system and method that provisions at least two (2) receivers in a topology that allows each receiver to acquire wireless communication signals through different diverse antenna fields. Each receiver acquires the signal, and demodulates, decodes and sends data to the data terminal component. The data terminal component resolves packet alignment issues and selects the best data. This improves system reliability and reduces the system susceptibility to data corruption or loss of data due to signal fading that might occur on a single antenna field. Provisioning a wireless system in this manner reduces the likelihood that the same fading phenomena, resulting from either multipath and/or shadowing affects, impair signal reception causing data dropout or loss of data.

19 Claims, 6 Drawing Sheets

U.S. PATENT DOCUMENTS

| | | | |
|---|---|---|---|
| 2006/0268963 A1* | 11/2006 | Yoshida | 375/148 |
| 2007/0285315 A1* | 12/2007 | Davis et al. | 342/377 |
| 2008/0037682 A1* | 2/2008 | Tsai et al. | 375/267 |
| 2009/0086657 A1* | 4/2009 | Alpert et al. | 370/310 |
| 2010/0135198 A1 | 6/2010 | Shin et al. | |
| 2010/0223522 A1* | 9/2010 | Duggan | 714/748 |
| 2010/0246547 A1 | 9/2010 | Yoon | |
| 2011/0194475 A1* | 8/2011 | Kim et al. | 370/311 |
| 2011/0243081 A1* | 10/2011 | Liu et al. | 370/329 |

\* cited by examiner

SYSTEM AND METHOD OF ENHANCED QUALITY OF SERVICE OF WIRELESS COMMUNICATION BASED ON REDUNDANT SIGNAL RECEPTION ON TWO OR MORE ANTENNA DIVERSITY INPUTS

FIELD

The present application is directed to the field of wireless communication systems. More specifically, the present application is directed to the field of redundant signal reception in wireless medical monitoring systems.

BACKGROUND

In current wireless communication systems, there are problems of loss of data or data dropout of wireless medical telemetry services caused by fading. Fading refers to the deviation in the attenuation that a carrier-modulated RF signal experiences over a propagation media. The fades usually result from multipath propagation, (where different paths of the same signal combining in a destructive manner), or shadowing, (where obstacles obstruct the wave propagation). Fading models can be used to describe how fades might occur, but signal fading is a random phenomenon and cannot be eliminated from any wireless communication system.

Thus, it is desirable to reduce the probability that a signal fade will impact the performance of a wireless system. By reducing the probability that a fade causes a loss of data or data dropout in the system, the reliability of the wireless communication system is improved.

SUMMARY

The present application includes a system and method that provisions at least two (2) receivers in a topology that allows each receiver to acquire, decode and demodulate data from a wireless communication signal through different diverse antenna. Each receiver sends the acquired data to the data terminal component. The data terminal component resolves packet alignment issues and selects the best data. This approach improves system reliability and reduces the system susceptibility to data corruption or loss of data due to signal fading or dropout that might occur on a single received signal. Since the joint probability of a fade occurring simultaneously on two or more independent antenna fields is much less than any single field, provisioning a wireless system in this manner improves the chance to receive correct data because at least one of the antenna fields that are redundantly monitored by the receiver infrastructure will typically not be in a fade.

In one aspect of the present application, an enhanced quality of service wireless communication system comprises a primary receiver configured to receive a wireless signal including medical data transmitted from a wireless medical device, a redundant receiver configured to receive the wireless signal from the wireless medical device wherein each of the primary and redundant receivers include a decoder and a transfer media component, wherein the decoder evaluates the quality of the wireless signal and extracts the medical data, and the transfer media component processes the wireless signal into a plurality of transfer data packets, and a data terminal component, wherein the data terminal component receives the plurality of data transfer packets from each of the primary and redundant receivers, and merges the plurality of transfer data packets into a composite data stream.

In another aspect of the present application, a method of enhanced quality of service in a wireless communication system comprises receiving a wireless signal transmitted from a medical device in a primary receiver, receiving the wireless signal from the medical device in a redundant receiver wherein each of the primary and redundant receivers include a decoder and a transfer media component, wherein the method further comprises the decoder evaluating the quality of the received wireless signal, and extracts the medical data, and the transfer media component processing the received medical data into a plurality of transfer data packets, and receiving the plurality of data transfer packets from each of the primary and redundant receivers in a data terminal component, and further comprising merging the plurality of transfer data packets into a composite data stream.

DETAILED DESCRIPTION

Figure 1:
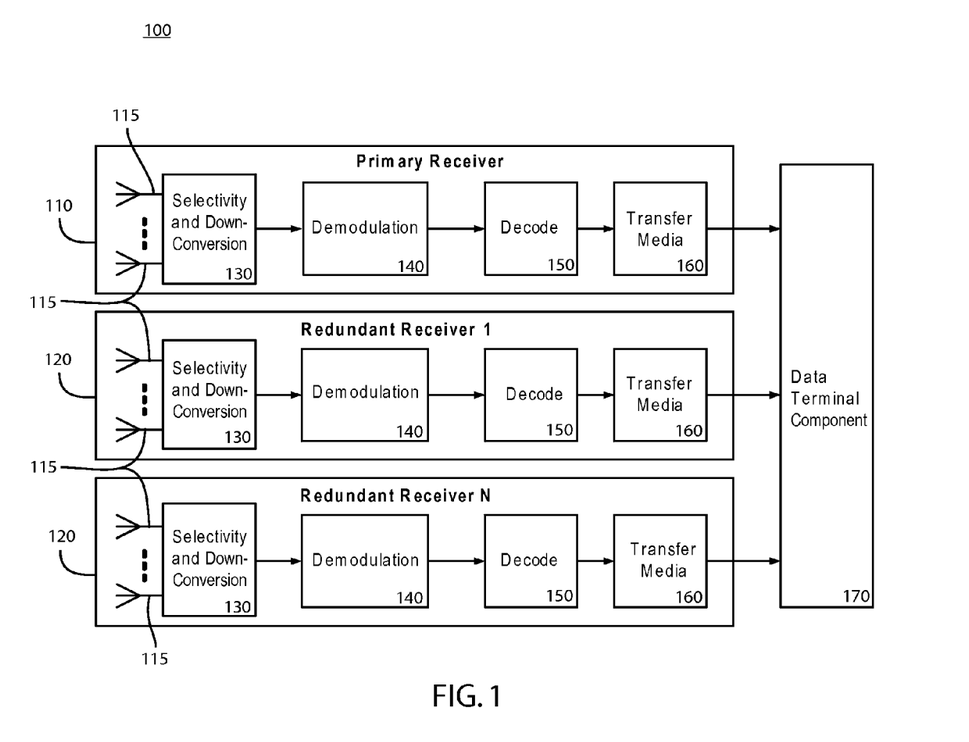
FIG. 1 is a schematic block diagram illustrating an embodiment of a receiver system of the present application.

The system and method of the present application involves the reception of a desired wireless communication signal through at least two different receiver paths, existing on either the same or unique physical receiver module. Referring to FIG. 1, redundant coverage in the receiver system 100 will involve signal reception from a primary receiver 110 and at least one redundant receiver 120. In the context of this application, signal reception refers to the following functional elements: antenna diversity, selectivity, demodulation, decoding and transfer of the decoded information. The received data shall be transferred from the receiver, either the primary receiver 110 or the redundant receiver 120, to a data terminal component 170 for reconstruction. In this embodiment, the data terminal component 170 is not required to be the final destination of the received data. The primary and redundant receivers 110, 120 offer the same performance characteristics, where the fundamental differences in reception results from antenna field diversity.

The receiver system 100 in FIG. 1 includes antennas 115 in each of the receivers 110, 120 that receive communication from the overall wireless system (not shown). These antennas 115 are deployed as spatially diverse antenna fields located across the provisioned service area of the wireless system. The location of each antenna 115 is based on specific design rules and results from a site survey. Because each antenna 115 is installed in a different location, the signal at each antenna 115 represents a unique realization of the wireless signal at any point in time. However, it should also be noted that any of the plurality of primary 110 and/or redundant receivers 120 may be implemented in a single hardware component.

Figure 2:
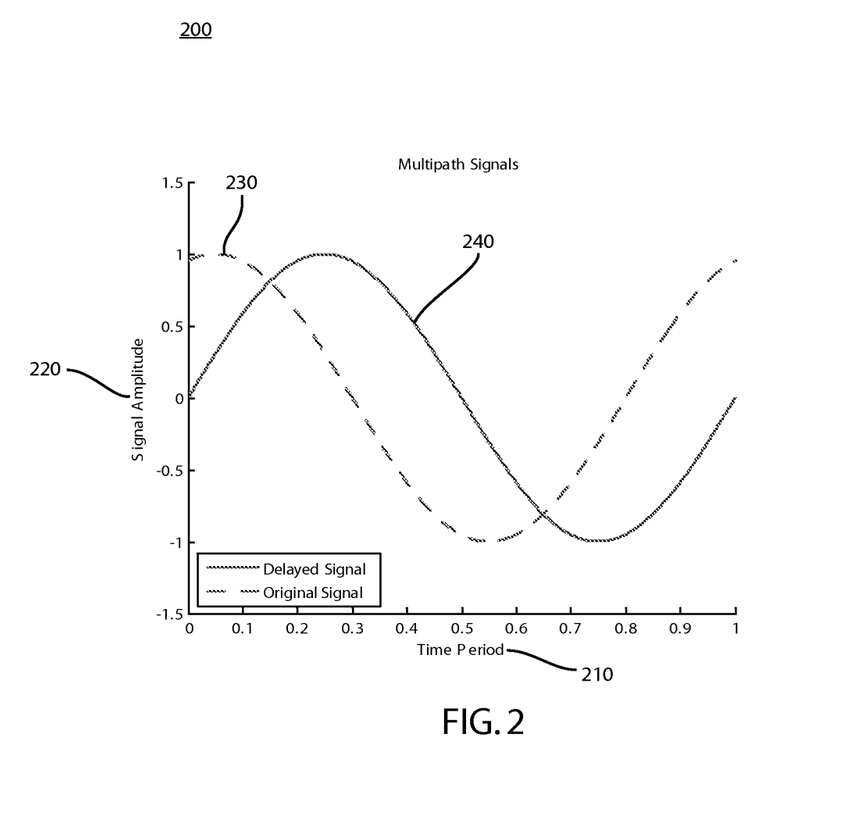
FIG. 2 is a graphical representation illustrating an embodiment of multiple signals of the present application.

Configuring antennas 115 in this manner is particularly helpful for use with indoor systems where line-of-sight between a transmitting device and receiver is not necessary a clear path. In these situations, signals reflect off permanent obstacles or other objects as they radiate away from the source. These reflections, result in alternate signal paths between the transmitter and receivers 110, and 120, which can be referred to as multipath situations or signals. When these multipath signals are combined at the aperture of the antenna 115, they can impact the quality of the received signal. The reflections introduce time-of-flight delays that manifest themselves as phase offsets in the received signal. This effect is illustrated in the multipath signal graph 200 in FIG. 2. This graph 200 shows that if a signal path is longer because of the number of reflections it will delay the signal arrival at the antenna aperture. The multipath signal graph 200 illustrates the original signal 230 and the delay signal 240 graphically, with a signal amplitude 220 along the y axis of the multipath signal graph 200, over a time period 210 on the x axis of the multipath signal graph 200. This multipath signal graph 200 illustrates how one signal from a transmitter in a wireless system may be received in a delayed fashion due to the effects of the environment.

Since there is currently no system or method to eliminate multipath signals in a wireless indoor environment, in some cases these effects can cause destructive interference and result in fading or reduced signal power of the received signal. This effect is illustrated in the antenna signal graph 300 in FIG. 3. This graph 300 presents an example of a signal fade situation that may occur in a typical wireless system. Here the received signal power 320 differs as received by two different antennas, antenna signal (1) 330 and antenna signal (2) 340, verses time 310. The signal power fades 335 are shown to occur at different times and represent reception through independent antenna fields. If reception of signal antenna (1) 330 was used as the only signal for the receiver, as the signal faded 335, and the receiver signal power 320 was reduced, the ability to demodulate the signal may become impaired. Using a single reception path through the receiver and antenna diversity provides advantages over a system using just a single antenna, because the receiver in a diverse system can detect the fade 335 and hand over reception to an alternate antenna.

Figure 3:
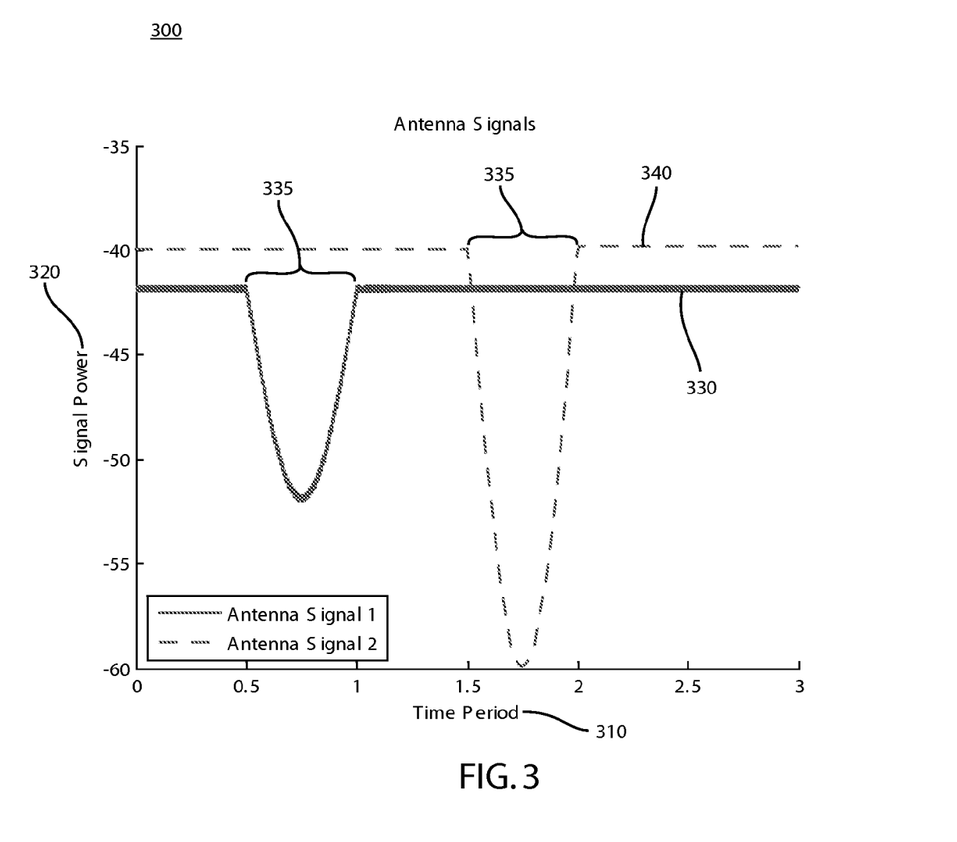
FIG. 3 is a graphical representation illustrating an embodiment of multipath fading of the present application.

Still referring to FIG. 3, in situations where fading is gradual, an antenna-switching algorithm in the receiver may detect the fade 335 and facilitate hand over of reception to another antenna, thus, preventing any dropout or degradation in performance. However, when the fades 335 occur rapidly, the antenna switching might not be capable of detecting the fade event 335 before degradation in performance manifests itself as a loss of data. Thus, reliability improvement of the wireless communication system may be achieved by the system and method of the present application that utilizes redundant reception on diverse antenna fields. This method will also prevent fast fades received on a single antenna from impairing performance of the receiver.

Referring again to FIG. 1, to consider redundant reception, the functional elements involved in a single reception path must be understood. These functional elements provide signal conditioning and implement signal processing techniques that allow the receiver 110, 120 to acquire the desired information as it was transmitted across a communication channel. Each of the primary and redundant receivers 110, 120 in FIG. 1, contains an image of a typical receiver 110, 120 signal path. The demodulator 140 and decoder 150 are well known in the art and defined in literature. The receiver system 100 may utilize known demodulators 140 and decoders 150, or those specially designed for the receiver system 100. The Selectivity and Down-Converter (SDC) component 130 and Transfer Media component 160 shall be explained in more detail in the following paragraphs.

The SDC component 130 acts as the interface to the antenna 115 infrastructure and provides multiple access support for the desired multiplexing scheme implemented throughout the wireless network. This SDC component 130, along with the antenna infrastructure, provides the physical media to acquire the wireless signal. Once an RF signal is obtained, circuitry or firmware in the SDC component 130 provide the necessary filtering to isolate the desired spectral content of the signal, and down-convert or realign the signal to the desired frequency location for acquisition and demodulation. The signal conditioning is not restricted to either the analog or digital domains and may span portions of both domains to isolate the desire signal.

After the desired signal is acquired by the SDC component 130, it is processed with a demodulator 140 to obtain the information contained within the desired signal. This information is decoded by the decoder 150 and the desired data is obtained by the receiver 110, 120. This desired data is passed to a transfer media component 160 that organizes or encodes the data into a defined format. This formatted data is then sent to a data terminal component 170 for processing. It should be noted that the data terminal component 170 includes a storage medium and a processor, wherein the storage medium includes a set of executable code including instructions to operate the above-described method of the primary receiver 110 and the redundant receivers 120. The set of executable code stored in the storage medium of the data terminal component 170 is executed by the processor, thus effectuating the operation of the receiver system 100. It should further be noted that alternative embodiments may include such hardware components in the primary receiver 110, the redundant receivers 120, or in other locations in the receiver system 100.

In the receiver system 100 utilizing redundant reception, at least two independent instances of the single reception path, as described in the preceding paragraphs are implemented. Each path includes a diverse antenna 115 input, and SDC component 130, a demodulator 140, a decoder 150 and a transfer media component 160. The steams of transferred data are sent to a common data terminal component 170.

The Data Terminal Component 170 will merge data paths from the primary and redundant receivers 110, 120 into a single data stream representing the information from the transmitting device (not shown). The method of combining this information can include several schemes to ensure that the best result is obtained.

Figure 4:
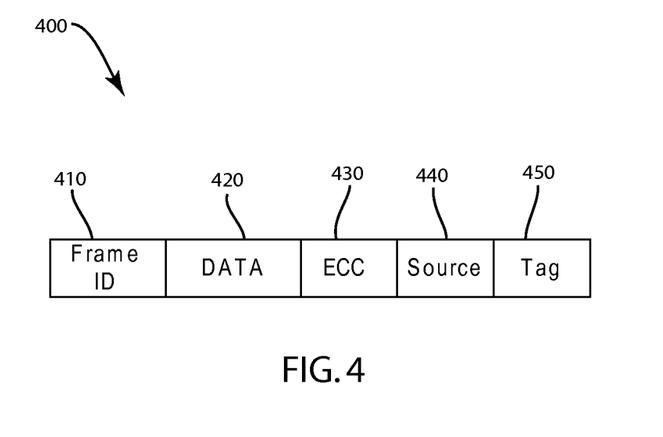
FIG. 4 is a schematic block diagram illustrating an embodiment of a transfer data packet of the present application.

Referring to FIG. 4, transferred data shall preferably reside in an encoded transfer data packet 400 format, which includes at a minimum a frame ID 410, ECC 430 and source 440 location. These packets 400 can be tagged 450 by the decoder 150 (FIG. 1) as good packets when no errors in the data 420 or no uncorrected data 420 errors occur, or tagged 450 as bad packets when uncorrected data 420 error causing loss of data is present. The transfer data packet 400 includes a frame ID 410 that is used to identify the data 420, and time stamp the data 420 for each data packet 400 frame. Referring to FIG. 1 simultaneously, when the data 420 is received in any of the receivers 110, 120, and is demodulated by the demodulator 140 and decoded in the decoder 150, the results of the information from the decoder 150 is the data packet 400. The ECC 430 determines whether the data is correct, and if it is correct, then the tag 450 indicates that that particular transfer data packet 400 is a good data transfer packet 400. The source 440 indicates where the transfer data packet 400 came from, that is, whether it came from the primary receiver 110 or from any one of the redundant receivers 120.

Figure 5:
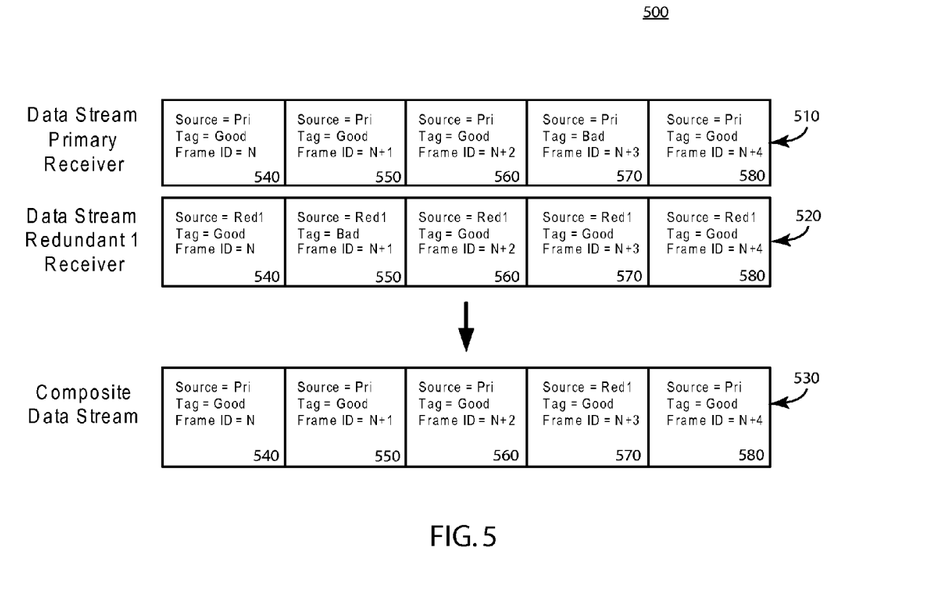
FIG. 5 is a schematic block diagram illustrating an embodiment of a data stream reconstruction of the present application.

Referring now to FIG. 5, the data terminal component 170 (FIG. 1) sorts good packets 400 (FIG. 4) in a sequential manner to reconstruct a data stream 500 and concatenate known good packets 400 together to form a composite data stream 530. The composite data stream 530 could contain good packets 400 from any receiver 110, 120, whether it was a primary receiver 110 or a redundant receiver 120, dedicated to the reception of the desire signal. Still referring to FIG. 5, a primary receiver data stream 510 and a redundant receiver data stream 520 are aligned as shown. These two receiver data streams 510, 520 are aligned by frame ID, that is, frame n 540 is aligned as are frames n+1, n+2, n+3, and n+4, 540, 550-580. The composite data stream 520 illustrates a composite of the two receiver data streams 510, 520, including a data packet with a good tag for each frame ID. This composite data stream 530 is constructed by comparing the data packets from the primary receiver data stream 510 to the redundant receiver data stream 520 for each frame. For example, comparing the frame n 540 data packets, it is clear that both the primary receiver data stream 510 and the redundant receiver data stream 520 both include a "good" packet. Accordingly, the system may be preset to use the packet from the primary receiver data stream 510 in such cases. In frame n+1 550, the primary receiver data stream 510 has a good tag, while the redundant receiver data stream 520 has a bad tag. In such a case, the data terminal component 170 would choose the packet from the primary receiver data stream 510 for the composite data stream 530. In frame n+3 570, the redundant receiver data stream 520 is the only good data packet, and therefore this packet is included in the composite data stream 530. When the system includes many redundant receiver data streams 520, then the data terminal component 170 will have a set of rules that determines which redundant receiver data stream 520 having a "good" tag will contribute to the composite data stream 530 when the primary receiver data stream 510 has a bad packet.

Figure 6:
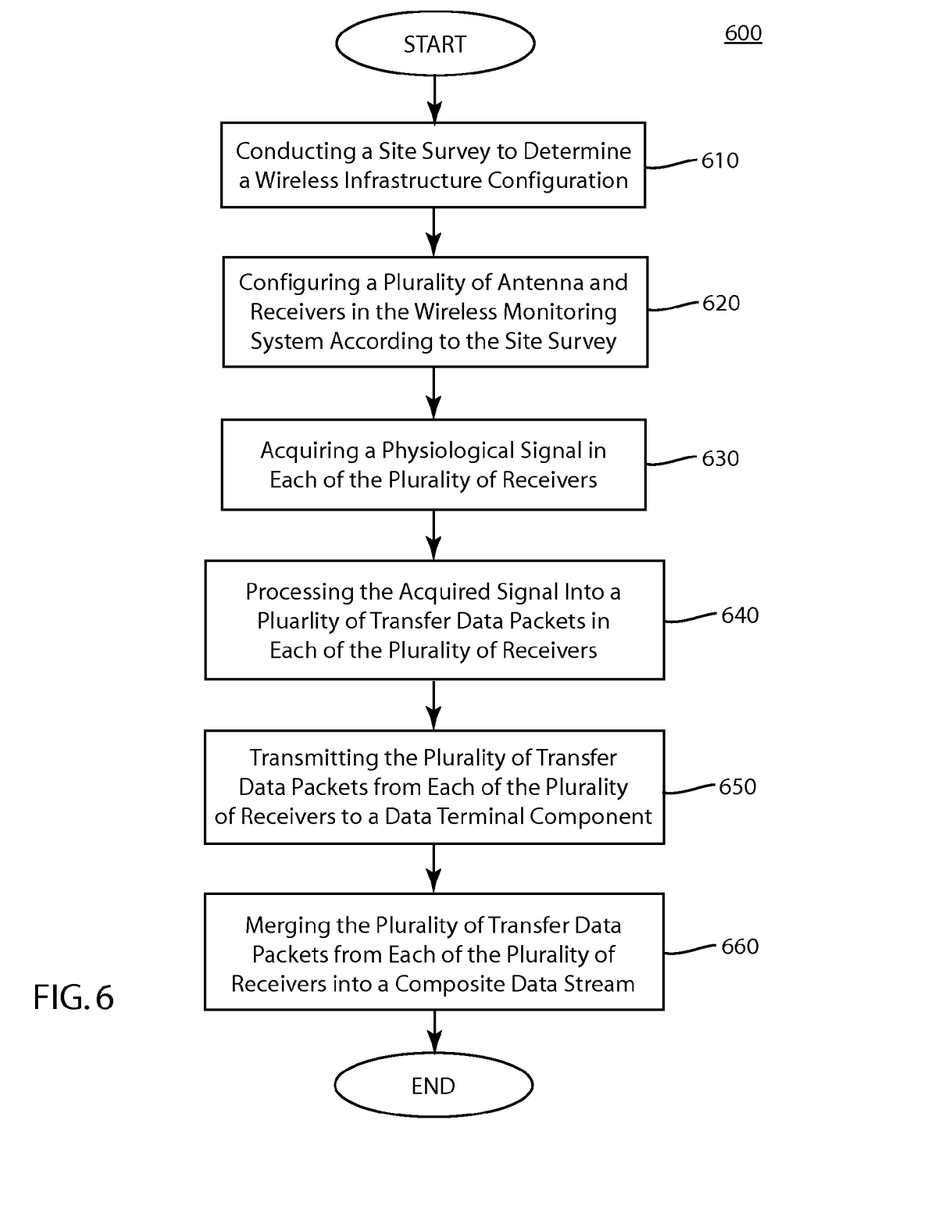
FIG. 6 is a flow chart illustrating an embodiment of a method of the present application.

Referring now to FIG. 6, a method 600 of the present application is illustrated. In step 610, a site survey is conducted on the physical area to determine an optimum wireless infrastructure configuration. Such site survey methods are well known in the art, and will allow the user of the wireless monitoring system to properly place the antenna 115 and receivers 110, 120 (FIG. 1) to ensure coverage for the entire monitored area. In step 620, the plurality of antenna 115 and receivers 110, 120 are configured in the wireless monitoring system according to the findings of the site survey. In step 630, a physiological signal is acquired in each of the plurality of receivers 110, 120, wherein the plurality of receivers 110, 120 each include an antenna 115 and an SDC module 130 for acquiring such signal. In step 640, the acquired signal is processed into a plurality of transfer data packets in each of a plurality of receivers 110, 120. In step 640, the signal is demodulated, and decoded in the plurality of receivers 110, 120. The decoder tags each of the plurality of transfer data packets with a "good" or "bad" tag depending on the quality of the acquired signal. The threshold for tagging each of the transfer data packets is predetermined by the user of the system and set accordingly. It is contemplated that the threshold for rating the quality of any given physiological signal as "good" or "bad" is highly dependent upon the type of physiological signal being processed.

Still referring to FIG. 6, the plurality of transfer data packets from each of the plurality of receivers 110, 120 is sent to a data terminal component 170. Here, the plurality of transferred data packets from each of the plurality of receivers 110, 120 is merged into a composite data stream. The transfer packets are merged by aligning each of the plurality of data packets for each of the plurality of receivers 110, 120 in sequential order by frame ID, and choosing a "good" data transfer packet from one of the receivers 110, 120 for each data packet 400 corresponding to a specific frame ID. When two or more of the transfer data packets for any frame ID are labeled as "good", a predetermined rule set will be used to select which transfer data packet to use in the composite data stream. As an example, if all of the transfer data packets have a "good" tag then the rule set may indicate that the data transfer packet from the primary receiver 110 should be utilized. The remainder of the plurality of receivers 110, 120 may be ordered accordingly. By way of second example, there may be a proximity transmitting device that issued the signal, that may set the order from which "good" transfer data packets should be taken. It should be noted that any number of methods or rules for selecting one of a plurality of "good" transfer data packets may be utilized.

In an alternate embodiment, the data 420 inside the packets 400 are evaluated bit-by-bit. In this embodiment, the application would perform a difference on the data packets 420 and tag 450 in the packets 400 that were different, and then reconstruct combinations of different permutations of the stream to search for an ECC 430 match.

Thus, by provisioning at least two receivers 110, 120, in a topology that allows each receiver 110, 120 to acquire wireless communication signals simultaneously through different diverse antenna 115 paths, system reliability is improved and system susceptibility to data corruption or loss of data due to signal fading is reduced. The technical advantages focus on improving the reliability of the wireless communication system. Redundant monitoring reduces the probability that a signal fade on any antenna field results in the loss of data or data dropout in the wireless system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An enhanced quality of service wireless communication system, the system comprising:
    a primary receiver configured to receive a wireless signal including medical data transmitted from a wireless medical device;
    a redundant receiver configured to receive the wireless signal from the wireless medical device wherein each of the primary and redundant receivers include a decoder and a transfer media component, wherein the decoder evaluates the quality of the wireless signal and extracts the medical data, and the transfer media component processes the wireless signal into a plurality of transfer data packets; and
    a data terminal component, wherein the data terminal component receives the plurality of data transfer packets from each of the primary and redundant receivers, and merges the plurality of transfer data packets into a composite data stream, wherein the data terminal component merges the plurality of data transmission packets by comparing a tag of the plurality of data transmission packets having a common frame ID, and selecting one data transmission packet having a good tag value for the composite data stream for each frame ID.

2. The system of claim 1, wherein the primary and redundant receivers each include an antenna, and a selectivity and down conversion (SDC) component, wherein the antenna and the SDC component receive and acquire the wireless signal from the patient monitoring device.

3. The system of claim 1, wherein the primary and redundant receivers include a demodulator, wherein the demodulator receives the acquired wireless signal from the SDC component, and demodulates the signal for the decoder.

4. The system of claim 1, wherein the primary and redundant receivers are configured in the wireless medical monitoring system according to a site survey.

5. The system of claim 1, wherein each of the plurality of transfer data packets includes a piece of data from the medical device having the frame ID, wherein the frame ID identifies data from a portion of the medical data.

6. The system of claim 5, wherein each of the transfer data packets includes an Error Correction Code (ECC), wherein the decoder uses the ECC to determine whether the data is correct.

7. The system of claim 5, wherein each of the transfer data packets includes a source, wherein the source indicates which receiver the transfer data packet comes from.

8. The system of claim 5, wherein the tag indicates whether the transfer data packet contains correctly received medical data.

9. The system of claim 1, wherein the data terminal component uses a set of predetermined rules for selecting a good transfer data packet for each frame ID that includes more than one good transfer data packet.

10. A method of enhanced quality of service in a wireless communication system, the method comprising:
    receiving a wireless signal transmitted from a medical device in a primary receiver;
    receiving the wireless signal from the medical device in a redundant receiver wherein each of the primary and redundant receivers include a decoder and a transfer media component, wherein the method further comprises the decoder evaluating the quality of the received wireless signal, and extracts the medical data, and the transfer media component processing the received medical data into a plurality of transfer data packets; and
    receiving the plurality of data transfer packets from each of the primary and redundant receivers in a data terminal component, and further comprising merging the plurality of transfer data packets into a composite data stream, wherein the data terminal component merges the plurality of data transmission packets by comparing a tag of the plurality of data transmission packets having a common frame ID, and selecting one data transmission packet having a good tag value for the composite data stream for each frame ID.

11. The method of claim 10, wherein the primary and redundant receivers each include an antenna, and a selectivity and down-conversion (SDC) component, wherein the method further comprises the antenna and the SDC component receiving and acquiring the received wireless signal from the medical device.

12. The method of claim 10, wherein the primary and redundant receivers each include a demodulator, wherein the method further comprises the demodulator receiving the acquired received wireless signal from the SDC component, and demodulating the signal for the decoder.

13. The method of claim 10, further comprising conducting a site survey and configuring an antenna infrastructure with primary and redundant receivers in the wireless medical system according to results from the site survey.

14. The method of claim 10, wherein each of the plurality of transfer data packets includes a piece of data from the medical data having the frame ID, wherein the method further comprises the frame ID identifying a portion of the medical data.

15. The method of claim 14, wherein the each of the transfer data packets includes an ECC, wherein the decoder uses the ECC determining whether the data is correct.

16. The method of claim 14, wherein each of the transfer data packets includes a source, wherein the method further comprises the source indicating which receiver the transfer data packet comes from.

17. The method of claim 14, wherein the method further comprises the tag indicating whether the transfer data packet correctly received medical data.

18. The method of claim 10, wherein the data terminal component uses a set of predetermined rules for selecting a good transfer data packet for each frame ID that includes more than one good transfer data packet.

19. An enhanced quality of service wireless communication system, the system comprising:
    a primary receiver configured to receive a physiological signal transmitted from a patient monitoring device;
    a redundant receiver configured to receive the physiological signal from the patient monitoring device wherein each of the primary and redundant receivers include a decoder and a transfer media component, wherein the decoder evaluates the quality of the physiological signal, and the transfer media component processes the physiological signal into a plurality of transfer data packet; and
    a data terminal component, wherein the data terminal component receives the plurality of data transfer packets from each of the primary and redundant receivers, and merges the plurality of transfer data packets into a composite data stream, wherein the data terminal component merges the plurality of data transmission packets by comparing a tag of the plurality of data transmission packets having common frame ID, and selecting one data transmission packet having a good tag value for the composite data stream for each frame ID, if any of the plurality of data transfer packets from the primary and redundant receivers includes a good transfer data packet, and further wherein the data terminal component uses a set of predetermined rules for selecting a good transfer data packet for each frame ID that includes more than one good transfer data packet.

* * * * *